US005132720A

United States Patent [19]

Kioka et al.

[11] Patent Number: 5,132,720

[45] Date of Patent: Jul. 21, 1992

[54] METHOD OF FORMING TWO-SIDED PRINTS

[75] Inventors: Hidekatsu Kioka, Yokohama; Mitsuo Tanaka, Machida, both of Japan

[73] Assignee: Ricoh Company, Ltd., Tokyo, Japan

[21] Appl. No.: 678,120

[22] Filed: Apr. 1, 1991

Related U.S. Application Data

[63] Continuation of Ser. No. 472,577, Jan. 30, 1990, abandoned.

[30] Foreign Application Priority Data

Feb. 1, 1989 [JP] Japan .................................. 1-23174

[51] Int. Cl.[5] .............................................. G03B 27/52

[52] U.S. Cl. ......................................... 355/24; 355/26; 355/77; 358/296

[58] Field of Search ................... 355/205, 207, 24, 26, 355/318, 319; 358/296, 300, 302

[56] References Cited

U.S. PATENT DOCUMENTS

| | | | |
|---|---|---|---|
| 4,499,500 | 2/1985 | Nagashima | 358/296 |
| 4,924,320 | 5/1990 | Tanaka et al. | 358/296 |
| 4,935,786 | 6/1990 | Veeder | 355/24 |

FOREIGN PATENT DOCUMENTS

| | | | |
|---|---|---|---|
| 0114966 | 11/1983 | European Pat. Off. . | |
| 0293968 | 12/1986 | European Pat. Off. . | |
| 1-113770 | 5/1989 | Japan | 355/319 |
| 1600818 | 3/1978 | United Kingdom . | |
| 2128139 | 10/1982 | United Kingdom . | |
| 2139193 | 3/1984 | United Kingdom . | |

*Primary Examiner*—L. T. Hix
*Assistant Examiner*—D. Rutledge
*Attorney, Agent, or Firm*—Cooper & Dunham

[57] ABSTRACT

A method of forming a two-sided print in an image forming apparatus comprises the steps of forming images on first sides of L recording sheets, leaving M recording sheets having images printed on the first sides thereof in the transport path with a non-stacked arrangement, where $M \geqq 2$, and sequentially forming images on the first sides of N-L recording sheets and forming images on second sides of N recording sheets in a predetermined sequence dependent on values of L, M and N.

10 Claims, 9 Drawing Sheets

METHOD OF FORMING TWO-SIDED PRINTS

This is a continuation of application Ser. No. 07/472,577, filed Jan. 30, 1990, now abandoned.

BACKGROUND OF THE INVENTION

The present invention generally relates to methods of forming two-sided prints, and more particularly to a method of forming a two-sided print which is applicable to an image forming apparatus such as a laser printer, a copying machine and a facsimile machine.

Conventionally, there is a method of forming a two-sided print in the following manner. That is, a reversing unit and an image forming unit are provided in a transport path of a recording sheet. First, the image forming unit forms an image on a first side of the recording sheet which is supplied from a paper supplying unit. Then, this recording sheet is turned over, that is, reversed in the reversing unit so that the image forming unit can form an image on a second side of the recording sheet.

For example, when copying 60 pages of a document onto 30 two-sided copies on a copying machine, 30 pages of the document are first copied onto the first sides of 30 recording sheets by feeding the 30 recording sheets to the image forming unit. The 30 recording sheets having images copied on the first sides thereof are stacked on an intermediate tray. Thereafter, the remaining 30 pages of the document are copied on the second sides of the 30 recording sheets by successively refeeding the 30 stacked recording sheets from the intermediate tray to the image forming unit. A two-sided print forming mode employing this method is often referred to as a stack mode.

However, according to the conventional stack mode, the stacked recording sheets on the intermediate tray must be separated one by one by a separating unit when successively refeeding the stacked recording sheets to the image forming unit. For this reason, when a malfunction of the separating unit occurs, there is a problem in that the reliability or quality of the paper transport deteriorates. In other words, the malfunction of the separating unit may cause two recording sheets to be refed to the image forming unit one on top of the other.

On the other hand, the alignment of the recording sheets which are stacked on the intermediate tray is made by adjustable guide plates which guide the two opposite sides of the recording sheets. But because the stacked recording sheets are aligned by the two opposite side edges thereof, it is impossible to stack recording sheets of different sizes in alignment. Accordingly, there is a problem in that the two-sided prints cannot be made successively on the recording sheets of different sizes.

Furthermore, a paper jam may occur when making the two-sided prints. In this case, it is necessary to obtain an accurate information on the page which is to be printed when the printing is resumed and the image which is lost if any due to the paper jam. Unless the accurate information is obtained, there is a problem in that the operation of making the two-sided prints must be repeated from the beginning.

On the other hand, a delay is introduced in the timing of the image in units of jobs or pages when a delay occurs in an image processing which is carried out by a controller. When such a timing delay of the image occurs, the conventional image forming apparatus does not wait for the delay to be corrected. In other words, the conventional image forming apparatus does not print an image and simply ejects a blank recording sheet. For this reason, there is a problem in that the user must afterwards make an appropriate editing of the prints.

SUMMARY OF THE INVENTION

Accordingly, it is a general object of the present invention to provide a novel and useful method of forming a two-sided print in which the problems described above are eliminated.

Another and more specific object of the present invention is to provide a method of forming a two-sided print in an image forming apparatus which includes paper transport means for transporting a recording sheet in a transport path within the image forming apparatus, image forming means for forming an image on one side of the recording sheet based on input image data, reversing means for reversing the side of the recording sheet which has the image formed on the one side thereof and refeeding means for refeeding the reversed recording sheet to the image forming means, the method comprising the steps of forming images on first sides of L recording sheets by the image forming means, controlling the transport means, the reversing means and the refeeding means so that M recording sheets having images printed on the first sides thereof exist in the transport path with a non-stacked arrangement, where $M \geqq 2$, and sequentially forming images on the first sides of N-L recording sheets and forming images on second sides of N recording sheets by the image forming means in a predetermined sequence dependent on values of L, M and N. According to the method of the present invention, it is possible to prevent a paper jam because the recording sheets are not stacked in the transport path when making the two-sided prints. In addition, it is possible to successively make two-sided prints of mutually different sizes. The non-stacked arrangement also makes it easy to attend to an abnormality such as a paper jam which occurs in the image forming apparatus.

Other objects and further features of the present invention will be apparent from the following detailed description when read in conjunction with the accompanying drawings.

DESCRIPTION OF THE PREFERRED EMBODIMENTS

A description will be given of an embodiment of a method of forming a two-sided print according to the present invention. In this embodiment, the present invention is applied to an image forming apparatus shown in FIG. 1 which is a laser printer.

Figure 1:
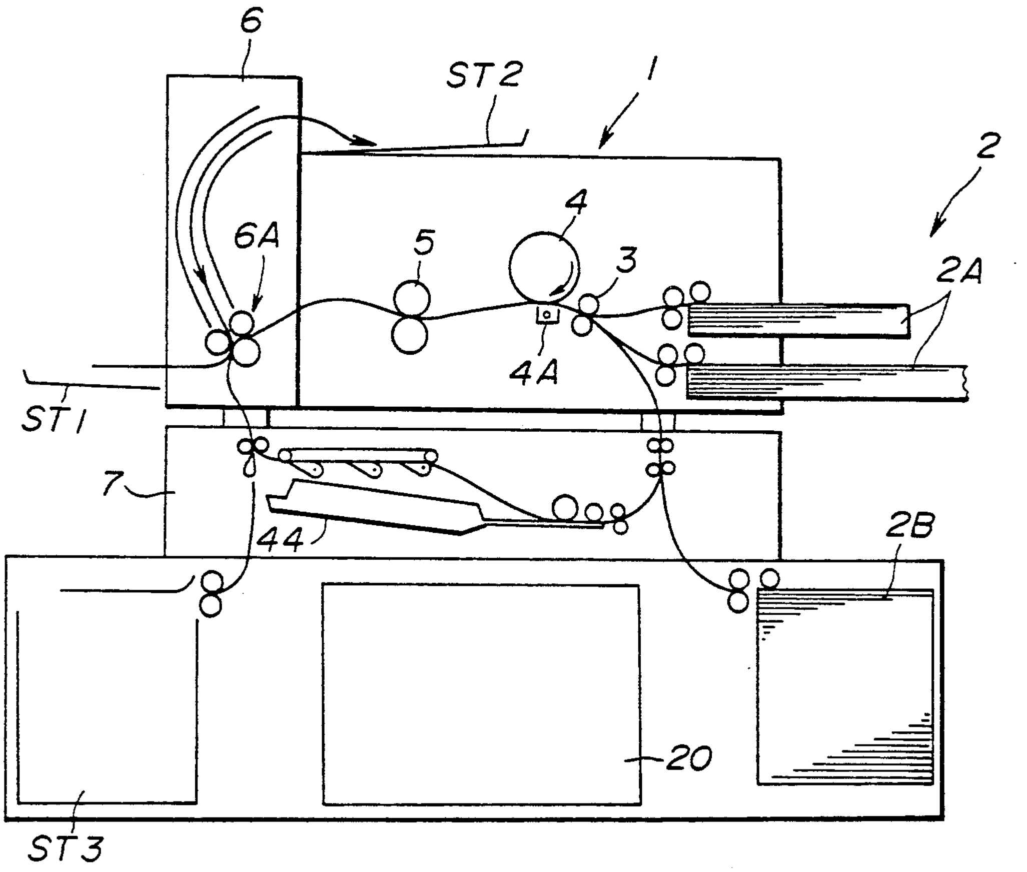
FIG. 1 is a side view in cross section generally showing an image forming apparatus to which an embodiment of a method of forming a two-sided print according to the present invention is applied.

In FIG. 1, a recording sheet is supplied from a paper supplying unit 2 of a main printer body 1 to resist rollers 3. The paper supplying unit 2 includes cassettes 2A and a unit 2B which is capable of supplying a large quantity of recording sheets.

An electrostatic image is formed on a surface of a photosensitive drum 4 by a laser write means (not shown). This electrostatic image is visualized into a toner image by a developing unit (not shown). The recording sheet is transported towards a transfer charger 4A with an appropriate timing so that the toner image on the photosensitive drum 4 is transferred onto the recording sheet. As a result, the toner image is formed on one side of the recording sheet. The photosensitive drum 4, the laser write means, the developing unit, the transfer charger 4A and the like constitute an image forming means.

The recording sheet is then transported along a transport path towards a fixing unit 5. The toner image on the recording sheet is fixed by the fixing unit 5 and is transported towards a reversing unit 6. The reversing unit 6 has rollers 6A which switch back to turn over, that is, reverse the side of the recording sheet. The rollers 6A constitute a reversing means. The reversed recording sheet is ejected through a lower eject opening in the reversing unit 6 and is supplied to a duplex unit 7. The reversed recording sheet is ejected onto an intermediate tray 44 within the duplex unit 7 and is refed to the main printer body 1 so as to form an image on the other side of the recording sheet.

The refed recording sheet is again supplied to the resist rollers 3. Thereafter, an image forming process is carried out similarly as described above and a two-sided print is supplied to the reversing unit 6. The two-sided print is ejected onto one of stackers ST1, ST2 and ST3 via the rollers 6A.

When ejecting the two-sided print on one of the stackers ST1 and ST3, the two-sided print is first reversed by the switch back of the rollers 6A so as to arrange the pages in order. On the other hand, when ejecting the two-sided print on the stacker ST2, the two-sided print is automatically reversed by a transport path which guides the two-sided print to the stacker ST2, and no reversing operation is carried out by the rollers 6A. The stacker ST3 is provided in correspondence with the unit 2B and is capable of stacking a large quantity of prints.

Figure 2:
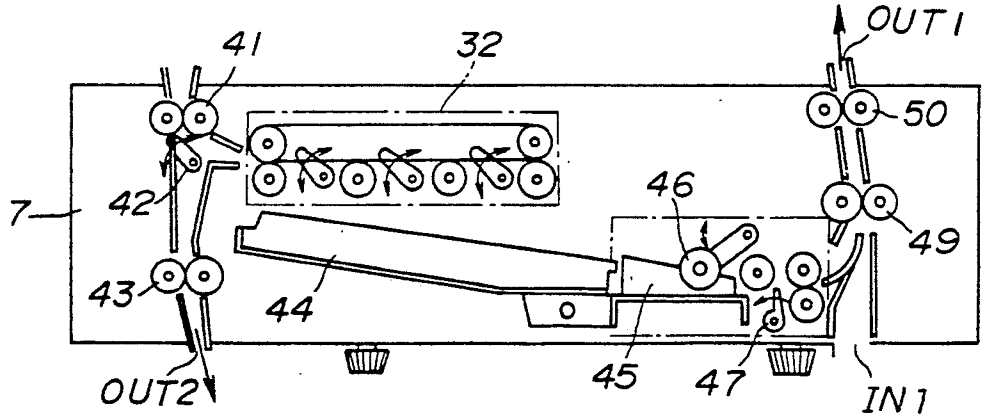
FIG. 2 is a side view in cross section showing a duplex unit shown in FIG.1 on an enlarged scale.
Figure 3:
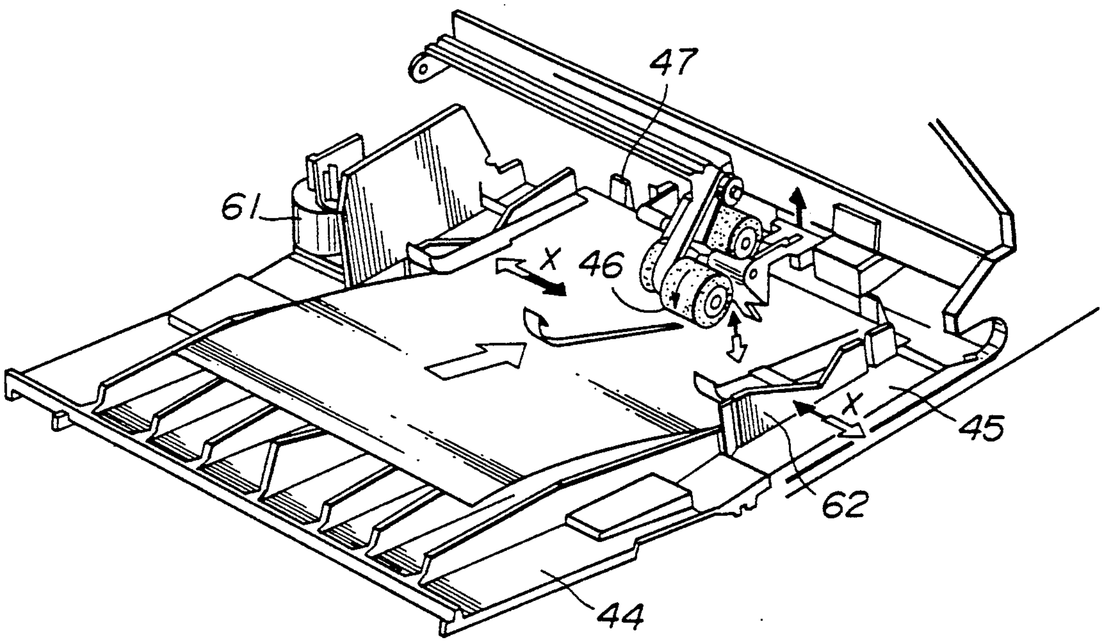
FIG. 3 is a perspective view showing an essential part of the duplex unit shown in FIG.2.

Next, a more detailed description will be given of the duplex unit 7. FIG. 2 shows the duplex unit 7 on an enlarged scale, and FIG. 3 shows an essential part of the duplex unit 7. The recording sheet which is supplied to the duplex unit 7 from the reversing unit 6 is first supplied to a gate part 32 via entrance rollers 41 and a path selector 42. The gate part 32 has a plurality of selectors for selecting an ejecting position of the received recording sheet depending on the size of the recording sheet. The gate part 32 ejects the recording sheet onto the intermediate tray 44.

The recording sheet which is ejected from the gate part 32 is transported by a roller 46 up to a position where a leading edge of the recording sheet hits a stopper 47. This stopper 47 is provided on a downstream side of the intermediate tray 44, and is pivottable between a stop position and a cancel position. An alignment unit 45 is also provided on the downstream side of the intermediate tray 44. The alignment unit 45 includes a pair of movable guide plates 62 and a motor 61 for driving the guide plates 62. The guide plates 62 are movable in directions which are approximately perpendicular to a transport direction of the recording sheet, as indicated by arrows X in FIG. 3. The guide plates 62 move simultaneously in opposite directions so as to guide two opposite side edges of the recording sheet and align the position of the recording sheet with reference to a center of the recording sheet along a width direction of the recording sheet. The recording sheet which is aligned on the intermediate tray 44 by the alignment unit 45 is refed to the main printer body 1 through an opening OUT1 by a refeeding means when the stopper 47 is switched to the cancel position. The refeeding means includes intermediate rollers 49 and upwardly ejecting rollers 50.

It is of course possible to stack and align a plurality of recording sheets on the intermediate tray 44. However, in this embodiment, it is assumed that the positioning and alignment on the intermediate tray 44 are only carried out with respect to one recording sheet.

In some cases, the recording sheet can be transported through the intermediate tray 44 without operating the alignment unit 45.

The duplex unit 7 also has an opening IN1. The recording sheet which is supplied from the unit 2B is supplied to the main printer body 1 via the openings IN1 and OUT1 of the duplex unit 7 when forming the image on one side of the recording sheet. The duplex unit 7 further has an opening OUT2. By switching the position of the path selector 42, it is possible to eject the recording sheet from the reversing unit 6 to the stacker ST3 via downwardly ejecting rollers 43 and the opening OUT2.

In this embodiment, the operation timings of the various parts of the laser printer are appropriately controlled so that no stacking of the recording sheets occurs in the transport path within the laser printer. In other words, the recording sheets are supplied, aligned and refed successively one recording sheet at a time, and the forming of an image on a second side of the recording sheet which already has an image formed on a first side thereof (that is, the forming of a two-sided print) and the forming of an image on a first side of another recording sheet take place alternately. In this specification, such a mode of image formation will be referred to as an interleaf mode.

During the interleaf mode, the recording sheet which has an image formed on a first side thereof is supplied to the duplex unit 7 and is aligned on the intermediate tray 44 by the guide plates 62. The operation up to this point is basically the same as the so-called stack mode of the conventional laser printer. However, in the interleaf mode, a second recording sheet is supplied after the alignment of the first recording sheet, but this second recording sheet is not stacked on top of the first recording sheet. In a state where the guide plates 62 are positioned to align the first recording sheet depending on the size of the first recording sheet, a paper supply clutch, a pickup solenoid and the like of the refeeding means are turned ON to make a preparatory paper supply for a predetermined time until a paper supply instruction is received. Such a preparatory paper supply is made to ensure a correct alignment of the second recording sheet even when the interval between the first and second recording sheets becomes small. The paper supply clutch, the pickup solenoid and the like of the refeeding means are turned ON in response to the paper supply instruction. Thereafter, the guide plates 62 separate from each other with a timing such that the first recording sheet is sufficiently pinched by the intermediate rollers 49, so that the incoming second recording sheet does not hit the guide plates 62. The above described operation is repeated to the last recording sheet.

The stopper 47 is switched to the cancel position when the preparatory paper supply is started. The stopper 47 returns to the stop position when a paper end sensor (not shown) no longer detects the recording sheet which is supplied by the preparatory paper supply. The guide plates 62 remain at the same position until the recording sheet reaches the intermediate rollers 49, and for this reason, no skew is introduced in the supply of the recording sheet.

Figure 4A:
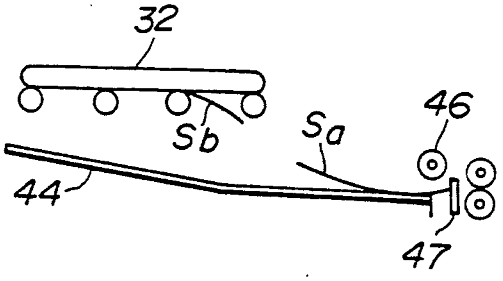
FIGS.4A through 4C are diagrams for explaining positions of recording sheets in the duplex unit.
Figure 4B:
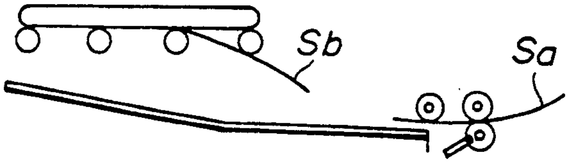
Figure 4C:
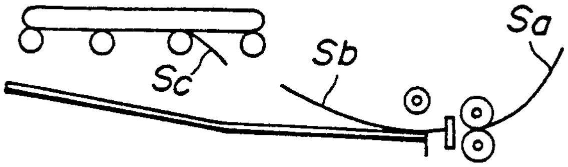

FIGS.4A, 4B and 4C respectively show positions of recording sheets Sa, Sb and Sc within the duplex unit 7 at different stages of the paper supply.

After the images are formed on the first sides of the recording sheets, the number of recording sheets which are located at various parts of the laser printer differs depending on the length of the transport path within the laser printer, the size of the recording sheets used, the interval between the recording sheets and the like. The number of recording sheets existing within the laser printer is denoted by No (>2), and No=4 in this embodiment.

Figure 5:
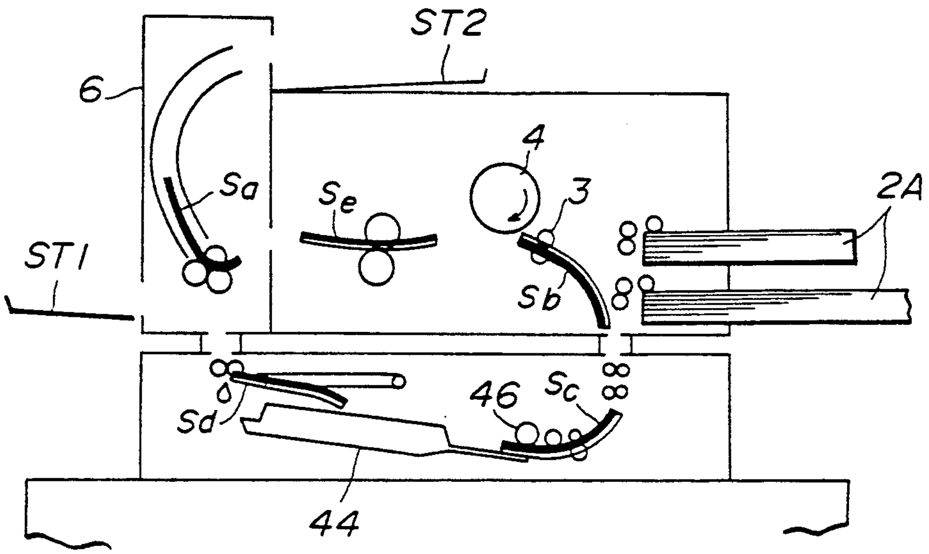
FIG.5 is a diagram for explaining positions of recording sheets in the image forming apparatus.

FIG.5 shows the recording sheets which exist within the laser printer after the images are formed on the first sides of the recording sheets. In FIG.5, a recording sheet Sa is a two-sided print and already has images formed on both sides thereof. Hence, four recording sheets Sb, Sc, Sd and Se which have images formed on the first sides thereof remain within the laser printer. Hence, images are to be formed on the second sides of these recording sheets Sb, Sc, Sd and Sd in this sequence.

Figure 6:
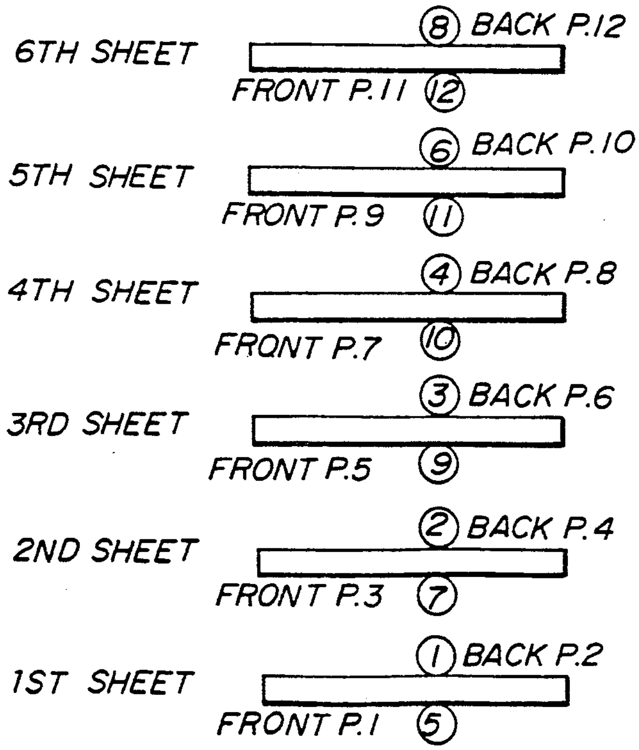
FIG. 6 is a diagram for explaining a stack of two-sided prints.

Under the condition that No =4, the printing sequence (1) through becomes as shown in FIG.6 when twelve pages of a document are to be printed onto six two-sided prints. In this case, the second page P.2 of the document is first printed on a back side of the first recording sheet. Then, the even numbered pages P.4 through P.8 are sequentially printed on the back sides of the second through fourth recording sheets. Next, the first page P.1 of the document is printed on a front side of the first recording sheet, and the tenth page P.10 of the document is printed on the back side of the fifth recording sheet. Then, the third page P.3 of the document is printed on the front side of the second recording sheet, the twelfth page P.12 is printed on the back side of the sixth recording sheet, the fifth page P.5 is printed on the front side of the third recording sheet, the seventh page P.7 is printed on the front side of the fourth recording sheet, the ninth page P.9 is printed on the front side of the fifth recording sheet, and the eleventh page P.11 is printed on the front side of the sixth recording sheet.

In other words, the printing takes place in the following sequence, where an underline indicates a printing which is alternately made with respect to the back and front sides of the recording sheets and a bracket indicates a printing of a page which completes a two-sided print.

*P.*2→*P.*4→*P.*6→*P.*8→(*P.*1)→*P.*10→(*P.*3)→

*P.*12→(*P.*5)→(*P.*7)→(*P.*9)→(*P.*11)

Therefore, the printing is made with respect to the back sides of the first through fourth recording sheets, the printing (P.1) is then made with respect to the front side of the first recording sheet, and the printing (P.10) is next made with respect to the back side of the fifth recording sheet. Thereafter, the printing on the back side and the front side are made alternately. When the printing is finished for the back sides of all of the recording sheets, the printing is made with respect to the front sides of the remaining (No =4) recording sheets.

Next, a description will be given of an operation of a device controller 21 in the interleaf mode, by referring to FIGS.7 through 9. As shown in FIG.10, the device controller 21 is provided within a system cabinet 20 of the laser printer. In FIG. 10, those parts which are the same as those corresponding parts in FIG.1 are designated by the same reference numerals, and a description thereof will be omitted. The system cabinet 20 includes in addition to the device controller 21 an A.C. distributor unit 201 and a user controller 202 which is coupled to a host system H. The main printer body 1 includes an image forming means 101, a video controller 102 and a sequence controller 103. The video controller 102 receives the image data which is received from the host system H via the user controller 202 and controls the laser write means. The sequence controller 103 drives a motor, a solenoid, a clutch and the like for controlling various parts of the main printer body 1 such as the parts for supplying the recording sheets, forming the images, transporting the recording sheets and ejecting the recording sheets. The sequence controller 103 also controls a high voltage source of the main printer body 1 for supplying a high voltage to various chargers.

Figure 7:
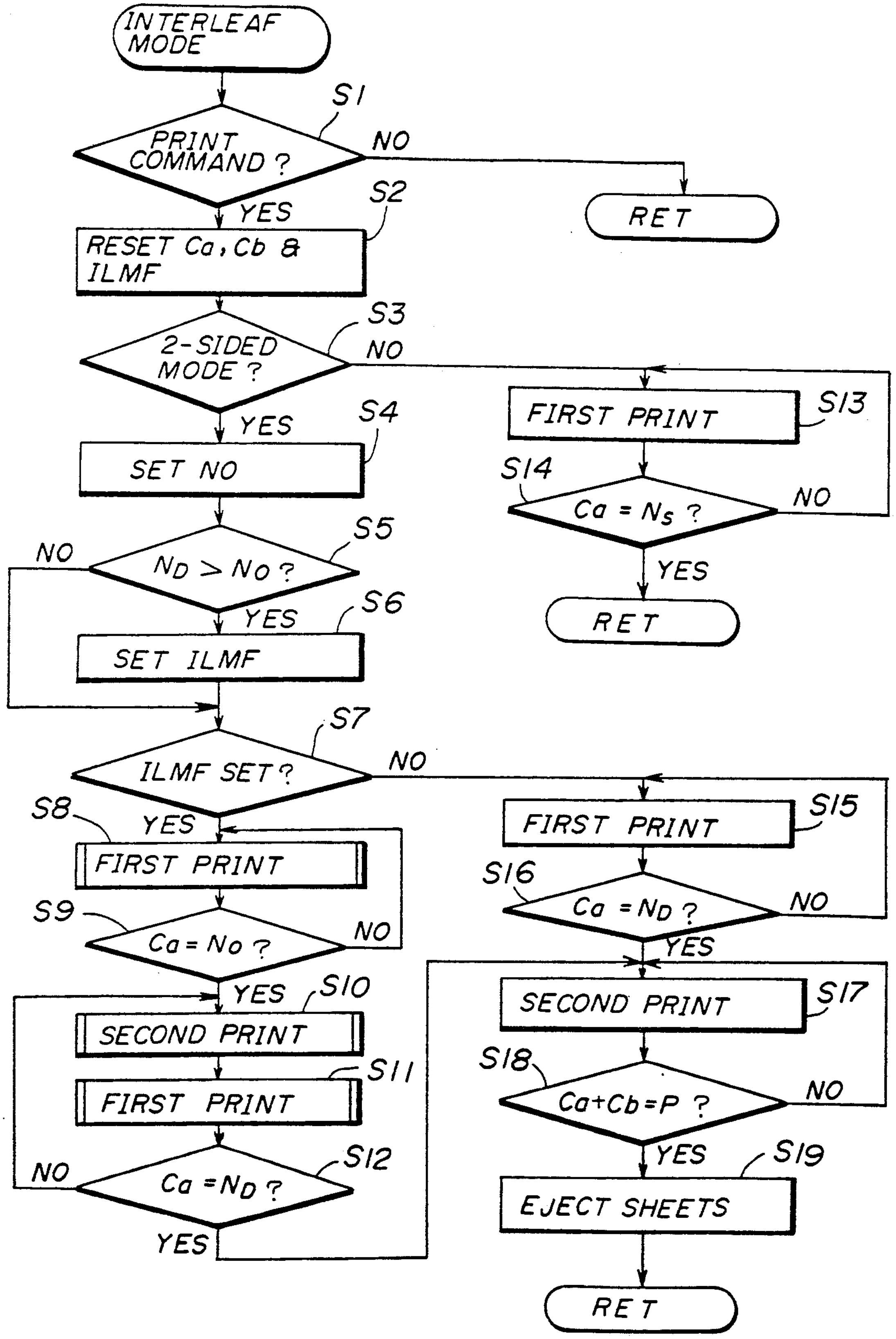
FIG. 7 through 9 are flow charts for explaining an interleaf mode.

In FIG.7, a step S1 discriminates whether or not a print command is received. When the discrimination result in the step S1 is YES, a step S2 resets counters Ca and Cb and an interleaf mode flag ILMF. The counter Ca counts the number of recording sheets which have images printed on the first sides thereof. The counter Cb counts the number of recording sheets which have images recorded on the second sides thereof during a two-sided print mode.

A step S3 discriminates whether or not the print mode is the two-sided print mode. When the discrimination result in the step S3 is NO, a step S13 carries out a first print process shown in FIG.8 and a step S14 discriminates whether or not Ca =Ns. In FIG.8, a step S20 increments the count of the counter Ca, and a step S21 makes the image formation. The process returns to the step S14 shown in FIG.7 after the step S21. Therefore, in the one-sided print mode, the printing is made with respect to the first sides of the recording sheets until the count in the counter Ca becomes Ns, where Ns indicates the total number of prints (that is, pages) to be made in the one-sided print mode.

When the discrimination result in the step S3 is YES, that is, in the two-sided print mode, a step S4 sets the number No to a predetermined value depending on the length of the recording sheet along the transport direction, the interval of the recording sheets, the length of the transport path and the like. A step S5 discriminates whether or not $N_D > No$, where $N_D$ denotes the total number of prints to be made. When the discrimination result in the step S5 is YES, a step S6 sets the interleaf mode flag ILMF. The process advances to a step S7 after the step S6 or when the discrimination result in the step S5 is NO.

The relationship between the total number of prints $N_D$ and a total number of pages P in the two-sided print mode can be described by the formula (1) for the even numbered pages and by the formula (2) for the odd numbered pages.

$$N_D = P/2 \ (P = 2(n+1),\ n = 0, 1, 2, \ldots) \quad (1)$$

$$N_D = (P+1)/2 \ (P = 2n+1,\ n = 0, 1, 2, \ldots) \quad (2)$$

The step S7 discriminates whether or not the interleaf mode flag ILMF is set. When the discrimination result in the step S7 is YES, a step S8 carries out the first print process shown in FIG.8. A step S9 discriminates whether or not Ca =No. The process returns to the step S8 when the discrimination result in the step S9 is NO. In other words, when the total number of prints $N_D$ is greater than the number No of recording sheets which may exist within the transport path, the recording is made with respect to the first sides of No recording sheets. In this embodiment, the pages P.2, P.4, P.6 and P.8 are printed.

Figure 8:
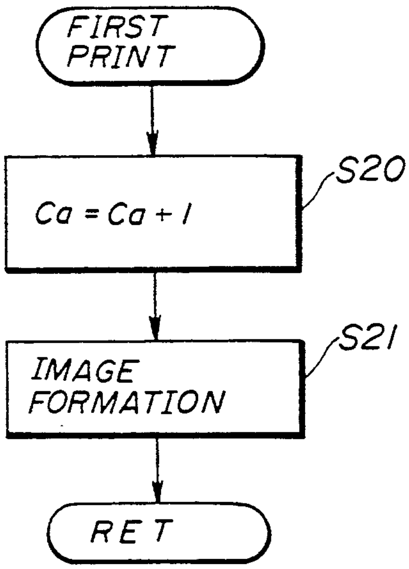
Figure 9:
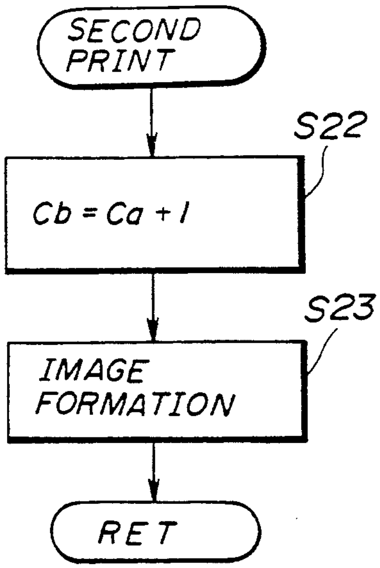
Figure 10:
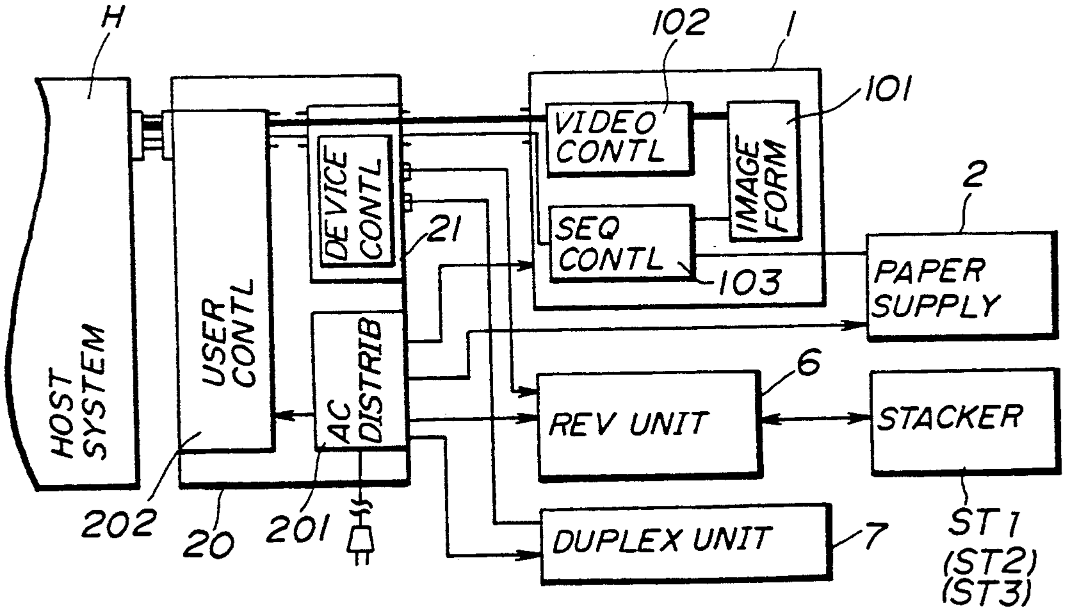
FIG. 10 is a system block diagram showing an essential part of the laser printer shown in FIG.1.

When the discrimination result in the step S9 becomes YES, a step S10 carries out a second print process shown in FIG.9. In FIG.9, a step S22 increments the count of the counter Cb, and a step S23 makes the image formation. The process returns to a step S11 shown in FIG.7 after the step S23. The step S11 carries out the first print process shown in FIG.8, and a step S12 discriminates whether or not $Ca = N_D$. The process returns to the step S10 when the discrimination result in the step S12 is NO.

Hence, in this embodiment, the second print process of the step S10 and the first print process of the step S11 are alternately carried out to print the pages P.1 and P.10 and the pages P.3 and P.12.

When the printing ends for the first sides of all of the recording sheets, the discrimination result in the step S12 becomes YES. In this case, a step S17 carries out the second print process shown in FIG.9, and a step S18 discriminates whether or not Ca+Cb=P. The process returns to the step S17 when the discrimination result in the step S18 is NO. On the other hand, a step S19 ejects the recording sheets within the laser printer when the discrimination result in the step S18 is YES. Hence, in this embodiments, the pages P.5, P.7, P.9 and P.11 are printed by the steps S17 and S18, and the image is not printed on the second side of the last recording sheet if the total number of pages to the printed in the two-sided print mode is an odd number.

On the other hand, when the discrimination result in the step S7 is NO, a step S15 carries out the first print process shown in FIG.8 and a step S16 discriminates whether or not $Ca = N_D$. The process returns to the step S15 when the discrimination result in the step S16 is NO, but the process advances to the step S17 when the discrimination result in the step S16 is YES. In other words, when the number of two-sided prints $N_D$ is smaller than the set number No, the steps S17 and S18 carry out the printing with respect to the remaining one side of the recording sheets after the printing with respect to the other side of the recording sheets is completed by the steps S15 and S16.

As shown in FIG.8, the step S20 increments the count in the counter Ca by one every time the printing is made with respect to the first side of the recording sheet in the step S15. On the other hand, the step S22 shown in FIG.9 increments the count in the counter Cb by one every time the printing is made with respect to the second (other remaining) side of the recording sheet in the step S17.

The above described procedure is carried out by a first control means which is constituted by the device controller 21 shown in FIG.10 and a second control means which is provided for each of the main printer body 1, the reversing unit 6, the duplex unit 7, the paper supplying unit 2 and the stackers ST1, ST2 and ST3. The second control means transmits and receives information between the first control means for controlling the various parts of the laser printer with appropriate timings.

Figure 11:
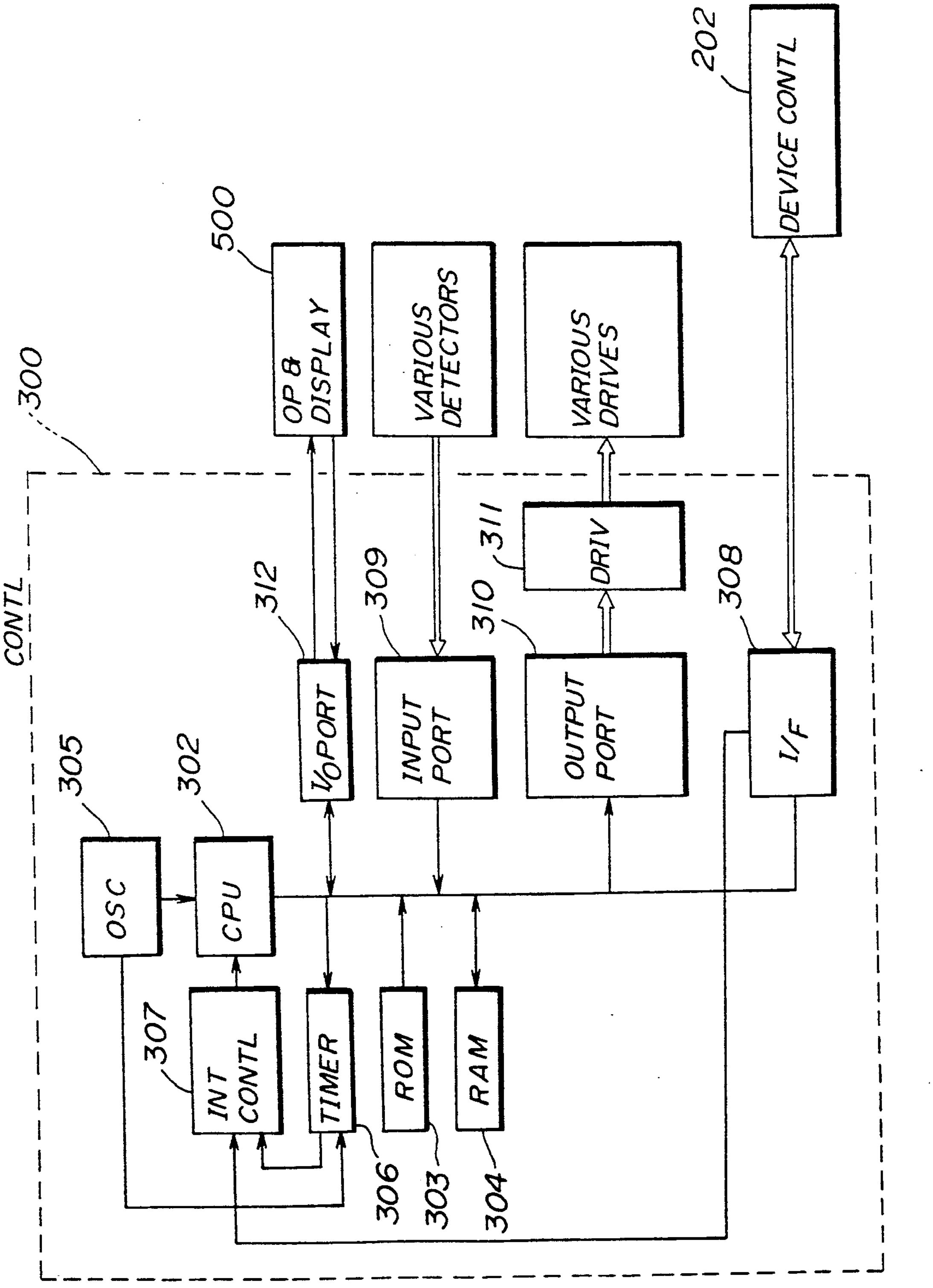
FIG.11 is a system block diagram showing an embodiment of a controller.

FIG.11 shows a controller 300 which functions as the second control means. In FIG.11, the controller 300 comprises a central processing unit (CPU) 302, a read only memory (ROM) 303, a random access memory (RAM) 304, an oscillator 305, a timer 306, an interrupt control circuit 307, an interface circuit 308, an input port 309, an output port 310, a driving circuit 311 and an input/output port 312 which are connected as shown. The interface circuit 308 is connected to the device controller 202. The input port 309 is connected to various detectors such as a photosensor, thermostat and a microswitch. The driving circuit 311 is connected to various drives such as a motor, a clutch, a solenoid, a lamp, a heater and a high voltage source. The input/output port 312 is connected to an operation and display part 500.

The controller 300 controls various parts of the laser printer in response to the instruction which is received from the device controller 202. The CPU 302 controls the general operation of the controller 300. For example, an 8-bit, microcomputer may be used for the CPU 302. The ROM 303 stores micro codes for controlling the operation sequence of various units. The RAM 304 is used for storing control data and the states of various units. The timer 306 is used as an interval timer for generating a basic time for control. The interrupt control circuit 307 controls interrupts including an external interrupt, a timer interrupt and a software interrupt.

The interface circuit 308 has a serial communication function. The input port 309 receives signals from the various detectors. The output port 310 outputs signals for driving the various drives via the driving circuit 311. The output port 310 also outputs a signal for controlling the high voltage source via the driving circuit 311. The input/output port 312 supplies various signals to the operation and display part 500 for displaying the operation states of the various units and the like.

According to the interleaf mode, the printing on the first side (one-sided print) and the printing on the second side (two-sided print) are alternately made, and the alignment and refeeding of the recording sheets are successively made one recording sheet at a time. For this reason, it is possible to make two-sided prints even when the size of the recording sheets differs between two successive recording sheets. Furthermore, it is possible to prevent a paper jam which often occurs when two recording sheets are simultaneously refed one on top of the other, since the recording sheets which have images printed on one side thereof are not stacked as in the case of the conventional laser printer employing the stack mode. On the other hand, even if the paper jam should occur during the two-sided print mode due to some reason, it is extremely easy to recover the page contents because the number of recording sheets existing in the transport path within the laser printer is relatively small.

When making successive prints in the interleaf mode, a delay in processing image data, a delay in transmitting the image data and other delays generated in an image processing controller (host system H and/or user controller 202 shown in FIG.10) are generated in units of pages in most cases. When such a delay is generated, it is necessary to temporarily stop the recording sheets in the transport path except for those recording sheets located at the printing and fixing parts, and wait until the delay is absorbed. After the delay is absorbed, the printing is resumed by transporting the recording sheets. Such a mode in which the transport of the recording sheets is temporarily stopped to absorb the delay generated in the image processing controller will hereinafter be referred to as a stoppable mode.

A description will now be made of the stoppable mode. When the delay is generated in the image processing controller, the conventional laser printer waits until the delay is absorbed by stacking the recording sheets on the intermediate tray. But in the stoppable mode of the interleaf mode, it is impossible to stack the recording sheets. For this reason, the paper transport members such as the rollers of the duplex unit 7 are stopped. As a result, the recording sheets are stopped in the transport path within the duplex unit 7 until the above described delay is absorbed.

As one method of stopping the paper transport member of the duplex unit 7, it is possible to provide a solenoid clutch between the paper transport member and a driving motor. In the following description, it is assumed that this method is used to stop the paper transport member.

As described above, the laser printer shown in FIG.1 makes the print by transporting the recording sheet by the resist rollers 3 in synchronism with the toner image which is formed on the photosensitive drum 4 based on the image data which is received via the device controller 21 and transferring the toner image onto the recording sheet.

In order to absorb the delay in the transmitted image data in this case, the recording sheet should be stopped at the position of the resist rollers 3. However, when the transport of only the recording sheet located at the resist rollers 3 is stopped, the other recording sheets existing within the transport path of the laser printer will catch up with the recording sheet which is stopped at the resist rollers 3 and cause a paper jam. For this reason, each paper transport member is stopped so that each of the recording sheets within the transport path of the laser printer stop.

When the number of recording sheets existing within the laser printer is No, the recording sheets are stopped at No locations within the laser printer. However, the recording sheet is not stopped at the printing and fixing part. The delay of the image data can easily be absorbed by stopping the recording sheets at the No locations within the laser printer.

As a modification, it is of course possible to stop the recording sheets at No-1 locations within the laser printer.

In the case where the recording sheets are stopped at No locations within the laser printer, a sensor for detecting the recording sheet must be provided at each of the No locations. As a result, the mechanisms and control operations become complex and increases the cost of the laser printer.

But when the recording sheets are stopped at No-1 locations, the total number of sensors which need to be provided is No-1. For this reason, the mechanisms and control operations become simple compared to the case where No sensors must be provided.

Figure 12A:
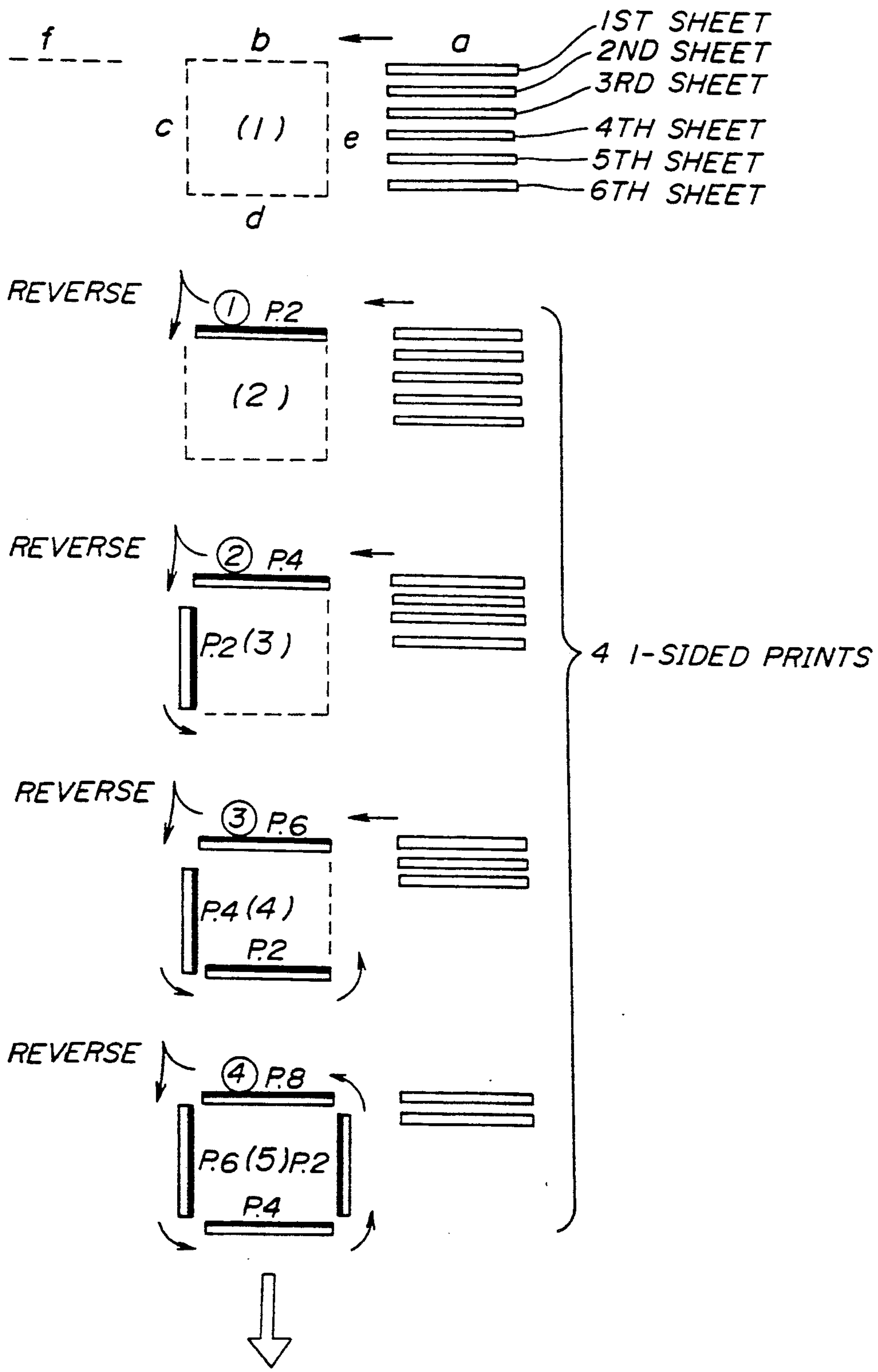
FIGS. 12A through 12C are diagrams for explaining the sequence of printing of the embodiment in a two-sided print mode.
Figure 12B:
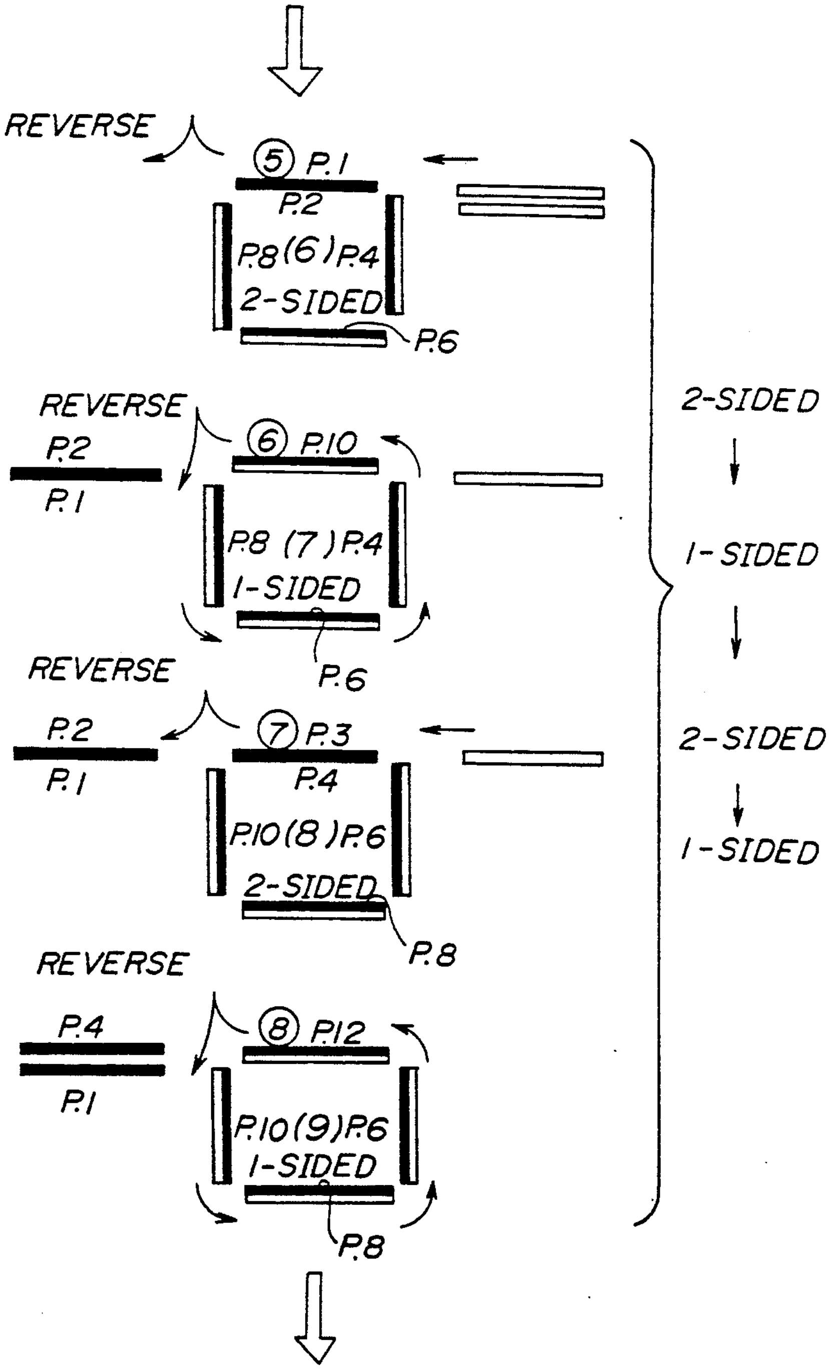
Figure 12C:
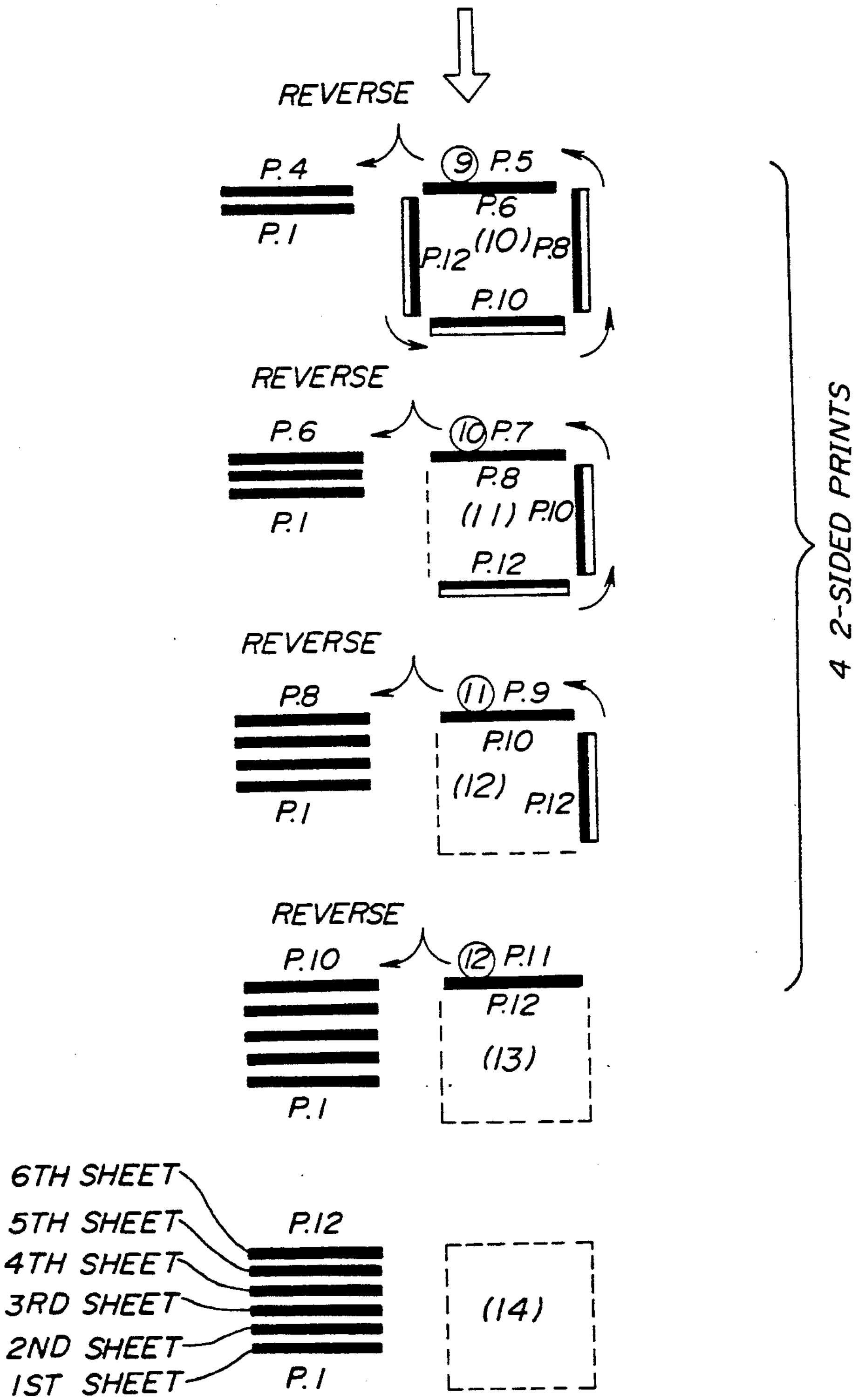

FIGS.12A through 12C are diagrams for explaining the sequence of printing of this embodiment in the two-sided print mode. It is assumed for the sake of convenience that the recording sheets have the A4 size and the number No=4. The printing sequence was described before in conjunction with FIG.6.

In FIGS.12A through 12C, a denotes a paper supply part, b denotes a printing part, c, d and e respectively denote stopping positions in the transport path, and f denotes a paper eject part (or stacker). In addition, arrows indicate the directions in which the recording sheets are transported.

In this embodiment, four one-sided prints (P.2, P.4, P.6 and P.8) are made in stages (2), (3), (4) and (5) shown in FIG.12A. Then, a one-sided print and a two-sided print are alternately made (P.1, P.10, P.3, P.12) in stages (6), (7), (8) and (9) shown in FIG.12B. After the images are printed on at least one side of all of the recording sheets, the images are printed on remaining sides of the recording sheets to make two-sided prints (P.5, P.7, P.9 and P.11) in stages (10), (11), (12) and (13) shown in FIG.12C.

The stopping positions c, d and e exclude the printing part b. The timing with which the recording sheet is stopped at one of the stopping positions c, d and e is set after the recording sheet passes the printing part b and before another recording sheet reaches the printing part b. The delay in the image data described above does not take into account a delay which is introduced during the printing in the printing part b, but takes into account the delay in the image data which often occurs in units of pages due to the waiting of job. Hence, it is possible to sufficiently cope with the delay in the image data by stopping the recording sheets at the stopping positions c, d and e.

As another measure against the delay in the image data, it is possible to provide means for stopping at least one of the paper transport members. In this case, the one paper transport member is stopped when the delay is introduced in the image data, and in addition, the recording sheets which follow the recording sheet which is stopped at the one paper transport member are ejected outside the transport path. Then, the one paper transport member is enabled after the delay in the image data is absorbed.

Further, the present invention is not limited to these embodiments, but various variations and modifications may be made without departing from the scope of the present invention.

What is claimed is:

1. A method for forming a two-sided print in an image forming apparatus which includes paper transport means for transporting a recording sheet in a transport path within said image forming apparatus, image forming means for forming an image on one side of the recording sheet based on input image data, reversing means for reversing the side of the recording sheet which has the image formed on the one side thereof and refeeding means for refeeding the reversed recording sheet to said image forming means, said method comprising the steps of:

(a) forming images on first sides of L recording sheets by said image forming means;

(b) controlling said transport means, said reversing means and said refeeding means so that M recording sheets having images printed on the first sides thereof exist in the transport path with a non-stacked arrangement, where M≧2;

(c) forming images on the first sides of N-L recording sheets which are different from said L recording sheets and forming images on second sides of N recording sheets by said image forming means in a predetermined sequence dependent on values of L, M and N; and (d) controlling said paper transport means when there is a delay in receiving the input image data so that at lest one of said M recording sheets in the transport path is stopped until the delay is absorbed by the stopping of the recording sheet.

2. The method as claimed in claim 1 wherein said step (c) of forming the images successively forms the images on the first sides of N-L recording sheets and thereafter successively forms the images on the second sides of said N recording sheets when L=N and M≧N.

3. The method as claimed in claim 1 wherein said step (c) of forming the images alternately forms the images on the second sides of said M recording sheets and the first sides of said N-L recording sheets, and successively forms the images on the second sides of N-M recording sheets after the images are formed on the first sides of all of the N recording sheets when L=M and N≧M.

4. The method as claimed in claim 1 wherein said step (c) of forming the images successively forms the images on the first sides of N-L recording sheets and thereafter successively forms the images on the second sides of said N recording sheets when L=N and M≧N, and said step (c) of forming the images alternately forms the images on the second sides of said M recording sheets and the first sides of said N-L recording sheets and successively forms the images on the second sides of N-M recording sheets after the images are formed on the first sides of all of said N recording sheets when L=M and N≧M.

5. The method as claimed in claim 1 wherein said step of controlling controls said paper transport means and said image forming means so that said paper transport means transports and stops each recording sheet in synchronism with the forming of the image by said image forming means.

6. The method of claim 1 wherein said step (d) of controlling said paper transport means stops only the recording sheets which are located in the transport path at a position excluding a position of said image forming means.

7. The method as claimed in claim 1 which further comprises the step of aligning each recording sheet in a direction approximately perpendicular to a direction in which the recording sheet is transported prior to refeeding the recording sheet to said image forming means by said refeeding means.

8. The method as claimed in claim 1 wherein M is determined by at least one of a length of the recording sheet along a transport direction in which the recording sheet is transported in the transport path, an interval of the recording sheets which are transported in the transport path and a length of the transport path along the transport direction.

9. The method as claimed in claim 1 wherein said image forming apparatus includes a fixing part for fixing the image which is formed on the recording sheet by said image forming means, and said step (d) of controlling said paper transport means stops only the recording sheets which are located in the transport path at a position excluding a position of the fixing part.

10. The method as claimed in claim 1 wherein said image forming apparatus includes a fixing part for fixing the image which is formed on the recording sheet by said image forming means, and said step (d) of controlling said paper transport means stops only the recording sheets which are located in the transport path at a position excluding a position of the fixing part and a position of said image forming means.

* * * * *